United States Patent
Tsujino

(10) Patent No.: US 10,841,515 B1
(45) Date of Patent: Nov. 17, 2020

(54) X-RAY GENERATION TUBE, X-RAY GENERATION APPARATUS, AND X-RAY IMAGING APPARATUS

(71) Applicant: Canon Anelva Corporation, Kawasaki (JP)

(72) Inventor: Kazuya Tsujino, Tokyo (JP)

(73) Assignee: CANON ANELVA CORPORATION, Kanagawa-ken (JP)

( * ) Notice: Subject to any disclaimer, the term of this patent is extended or adjusted under 35 U.S.C. 154(b) by 0 days.

(21) Appl. No.: 16/864,199

(22) Filed: May 1, 2020

Related U.S. Application Data

(63) Continuation of application No. PCT/JP2019/024986, filed on Jun. 24, 2019.

(51) Int. Cl.
  *H01J 35/06* (2006.01)
  *H04N 5/32* (2006.01)
  *H01J 35/08* (2006.01)

(52) U.S. Cl.
  CPC ............ *H04N 5/32* (2013.01); *H01J 35/064* (2019.05); *H01J 35/08* (2013.01)

(58) Field of Classification Search
  CPC ........... H04N 5/32; H01J 35/064; H01J 35/08
  See application file for complete search history.

(56) References Cited

U.S. PATENT DOCUMENTS

| 2001/0002208 A1 | 5/2001 | Matsushita et al. | |
| 2012/0307974 A1* | 12/2012 | Yamazaki | H01J 35/08 378/62 |
| 2013/0336459 A1 | 12/2013 | Choi et al. | |
| 2014/0126704 A1* | 5/2014 | Zou | H01J 35/025 378/197 |
| 2019/0035593 A1* | 1/2019 | Tsujino | H01J 35/065 |
| 2020/0258710 A1* | 8/2020 | Tsujino | G01N 23/04 |

FOREIGN PATENT DOCUMENTS

| JP | 2000030641 A | 1/2000 |
| JP | 2007265917 A | 10/2007 |

OTHER PUBLICATIONS

International Search Report (PCT/ISA/210) and Written Opinion (PCT/ISA/237) dated Aug. 13, 2019, by the Japanese Patent Office as the International Searching Authority for International Application No. PCT/JP2019/024986.

* cited by examiner

*Primary Examiner* — Marcus H Taningco
(74) *Attorney, Agent, or Firm* — Buchanan Ingersoll & Rooney PC

(57) ABSTRACT

X-ray generation tube includes electron gun, and anode having target to generate X-rays upon collision with electrons from the electron gun. The electron gun includes cathode having electron emitting portion, extraction electrode to extract the electrons from the electron emitting portion, and focusing electrode to focus the extracted electrons. The focusing electrode includes first portion having tubular shape, and second portion arranged inside the first portion. The first portion includes distal end facing the anode, the second portion includes opposing surface facing the anode, and the opposing surface includes electron passage hole through which the electrons from the electron emitting portion pass. Distance between the distal end and the anode is shorter than that between the opposing surface and the anode. Thermal conductivity of the distal end is lower than that of the second portion.

13 Claims, 5 Drawing Sheets

X-RAY GENERATION TUBE, X-RAY GENERATION APPARATUS, AND X-RAY IMAGING APPARATUS

CROSS-REFERENCE TO RELATED APPLICATION

This application is a continuation of International Patent Application No. PCT/JP2019/024986 filed on Jun. 24, 2019, the entire disclosure of which is incorporated herein by reference.

TECHNICAL FIELD

The present invention relates to an X-ray generation tube, an X-ray generation apparatus, and an X-ray imaging apparatus.

BACKGROUND ART

An X-ray generation apparatus is used in, for example, an X-ray imaging apparatus that captures a subject by X-rays. PTL 1 describes an X-ray generation tube that generates X-rays. The X-ray generation tube described in PTL 1 includes a cathode, a target, a first control grid arranged between the cathode and the target, and a second control grid arranged between the first control grid and the target. The second control grid includes an opening limiting element that suppresses spread of an electron beam. When the opening limiting element is provided, the electron beam dimension can be reduced.

CITATION LIST

Patent Literature

PTL 1: Japanese Patent Laid-Open No. 2007-265917

SUMMARY OF INVENTION

However, when an opening limiting element as described above is provided in the X-ray generation tube to reduce the X-ray focal dimension, a new problem that the X-ray focal dimension is not stable arises.

According to the first aspect of the present invention, there is provided an X-ray generation tube comprising an electron gun, and an anode including a target configured to generate X-rays upon collision with electrons from the electron gun, wherein the electron gun includes a cathode including an electron emitting portion, an extraction electrode configured to extract the electrons emitted from the electron emitting portion, and a focusing electrode configured to focus the electrons extracted by the extraction electrode, the focusing electrode includes a first portion having a tubular shape, and a second portion arranged inside the first portion, the first portion includes a distal end facing the anode, the second portion includes an opposing surface facing the anode, the opposing surface includes an electron passage hole configured such that the electrons from the electron emitting portion pass therethrough, a distance between the distal end and the anode is shorter than a distance between the opposing surface and the anode, and a thermal conductivity of the distal end is lower than a thermal conductivity of the second portion.

According to the second aspect of the present invention, there is provided an X-ray generation apparatus, and the X-ray generation apparatus comprises an X-ray generation tube according to the first aspect, and a driving circuit configured to drive the X-ray generation tube.

According to the third aspect of the present invention, there is provided an X-ray imaging apparatus, and the X-ray imaging apparatus comprises an X-ray generation apparatus according to the second aspect, and an X-ray detection apparatus configured to detect X-rays radiated from the X-ray generation apparatus and transmitted through an object.

DESCRIPTION OF EMBODIMENTS

Figure 1:
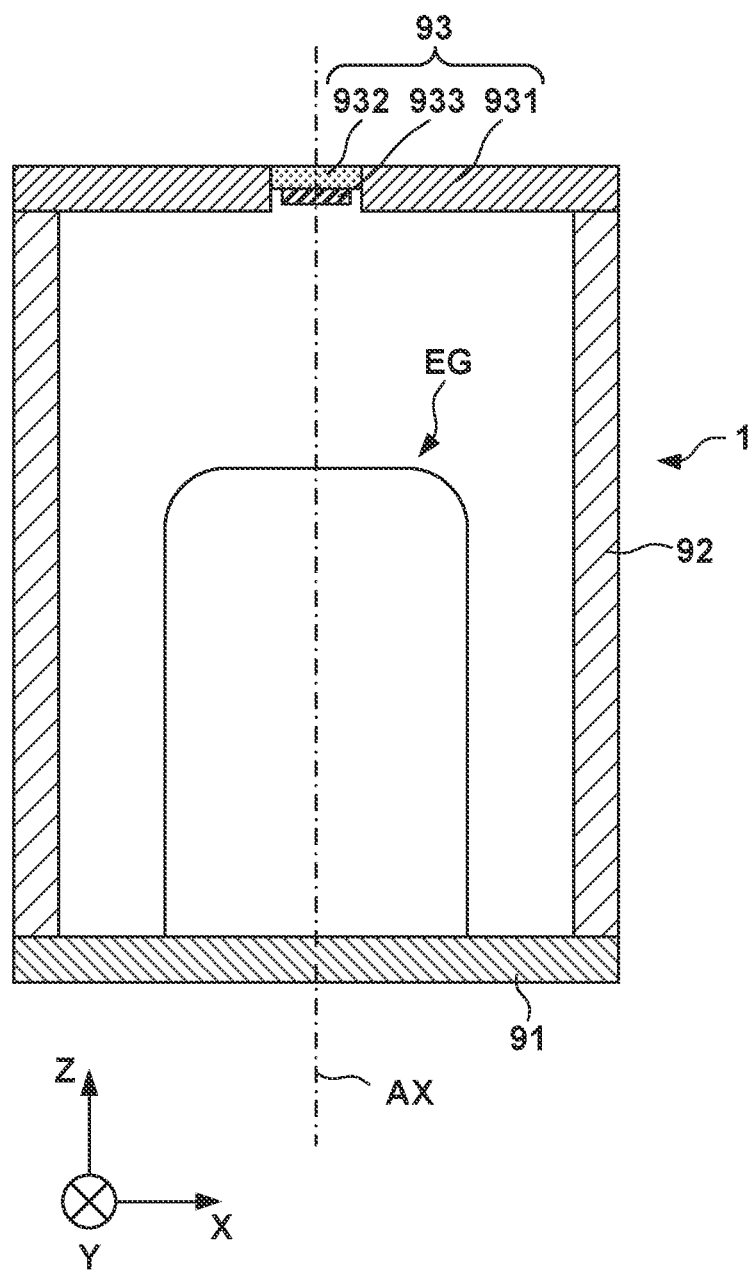
FIG. 1 is a view schematically showing the arrangement of an X-ray generation apparatus according to an embodiment of the present invention.

Hereinafter, embodiments will be described in detail with reference to the accompanying drawings. It should be noted that the following embodiments are not intended to limit the scope of the appended claims. A plurality of features are described in the embodiments. However, not all the combinations of the plurality of features are necessarily essential to the present invention, and the plurality of features may arbitrarily be combined. In addition, the same reference numerals denote the same or similar parts in the accompanying drawings, and a repetitive description will be omitted.

FIG. 1 schematically shows the arrangement of an X-ray generation tube 1 according to an embodiment of the present invention. The X-ray generation tube 1 can include an electron gun EG, an anode 93 including a target 933 that generate X-rays upon collision with electrons from the electron gun EG, and an insulating tube 92. In the X-ray generation tube 1, the anode 93 can be arranged to close one of the two opening ends of the insulating tube 92, and a closing member 91 including the electron gun EG can be arranged to close the other of the two opening ends of the insulating tube 92.

The anode 93 can include the target 933, a target holding plate 932 that holds the target 933, and an electrode 931 that holds the target holding plate 932. The electrode 931 is electrically connected to the target 933 and gives a potential to the target 933. The target 933 generates X-rays when electrons from the electron gun EG collide against the target 933. The generated X-rays are transmitted through the target holding plate 932 and radiated to the outside of the X-ray generation tube 1. The anode 93 can be maintained at, for example, the ground potential but may be maintained at another potential. The target 933 can be made of a material having a high melting point and a high X-ray generation efficiency, for example, tungsten, tantalum, molybdenum, or the like. The target holding plate 932 can be made of, for example, a material through which X-rays readily pass, such as, for example, beryllium, diamond, or the like.

Figure 2:
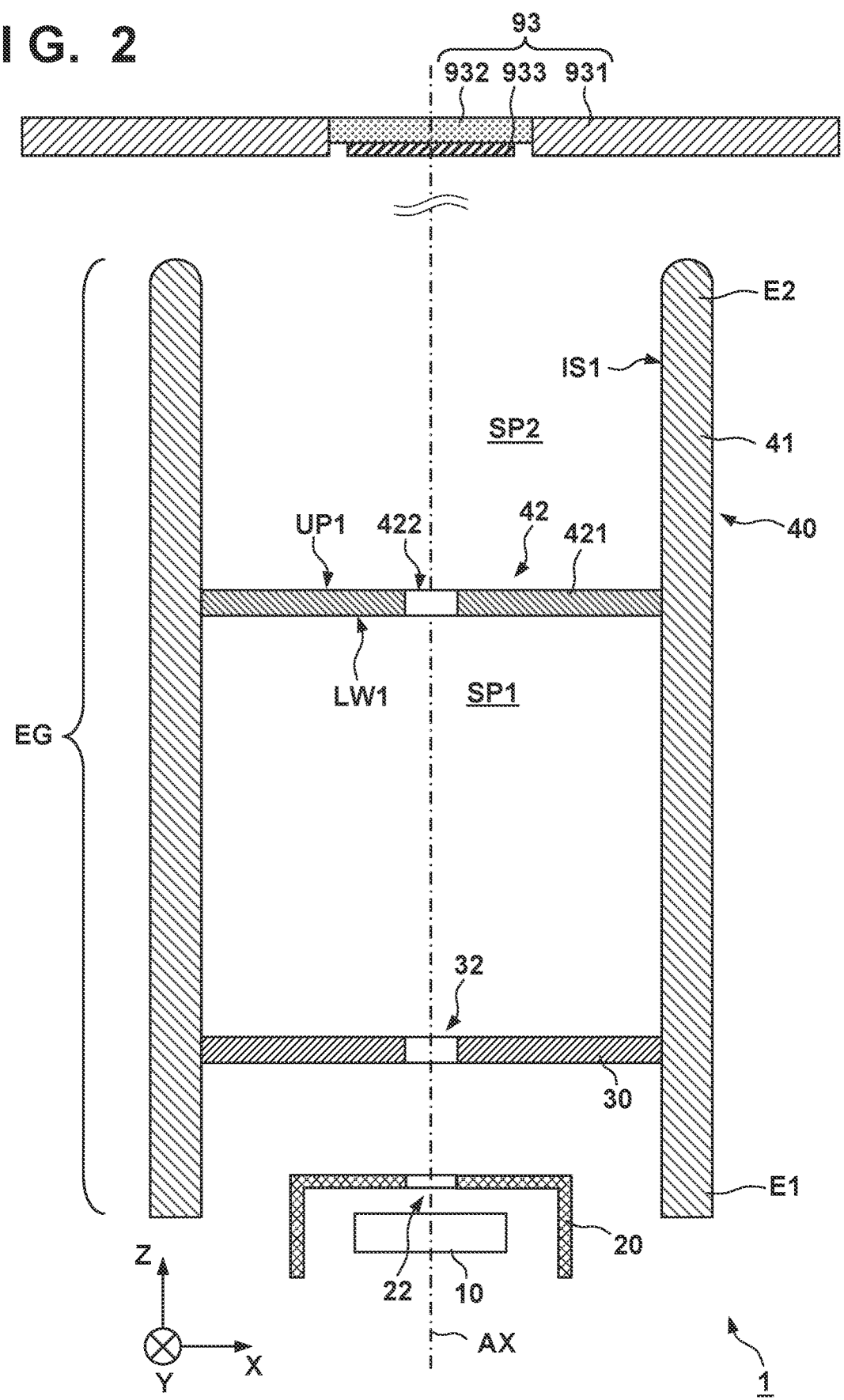
FIG. 2 is a sectional view schematically showing the arrangement of an electron gun according to the first embodiment of the present invention.

FIG. 2 schematically shows the arrangement of the X-ray generation tube 1 according to the first embodiment of the present invention. FIG. 2 shows the electron gun EG and the anode 93 which are arranged close. However, the electron gun EG and the anode 93 can be arranged farther apart. The electron gun EG can include a cathode 10 including an electron emitting portion that emits electrons, an extraction electrode 30 that extracts the electrons emitted from the electron emitting portion, and a focusing electrode 40 that focuses the electrons extracted by the extraction electrode 30. The cathode 10 can include, for example, an oxide cathode, an impregnated type cathode, a hot filament, or the like as the electron emitting portion. The electrons can be emitted when the cathode 10 is heated. The extraction electrode 30 includes a passage hole 32 through which electrons pass. The electron gun EG may include a gate electrode 20 between the cathode 10 and the extraction electrode 30. The gate electrode 20 includes a passage hole 22 through which electrons pass.

The focusing electrode 40 can include a first portion 41 having a tubular shape, and a second portion 42 extending from the first portion 41 inward in a tube diameter direction and including an electron passage hole 422 through which electrons pass selectively near the center of an electron beam. The first portion 41 and the second portion 42 are electrically connected to each other and can be given the same potential. Alternatively, the first portion 41 and the second portion 42 may be insulated from each other and given different potentials. The second portion 42 can include an inside surface (LW1) located on the side of the cathode 10, and an opposing surface UP1 that is the surface on the opposite side of the inside surface and faces the anode 93. The first portion 41 can include a distal end E2 facing the anode 93. The second portion 42 can include a plate portion 421, and the opposing surface UP1 can be provided on the plate portion 421. The plate portion 421 or the opposing surface UP1 can include an electron passage hole 422 that suppresses spread of the electron beam from the electron emitting portion of the cathode 10. The distance between the anode 93 and the distal end E2 of the first portion 41 is shorter than the distance between the anode 93 and the opposing surface UP1 of the second portion 42. The thermal conductivity of the distal end E2 is lower than the thermal conductivity of the second portion 42 (plate portion 421).

In the arrangement in which the thermal conductivity of the distal end E2 is lower than the thermal conductivity of the second portion 42 (plate portion 421), when a voltage higher than an X-ray generation electron acceleration voltage applied in driving of the X-ray generation tube 1 is applied across the first portion 41 and the anode 93 at the time of the manufacture or initial adjustment of the X-ray generation tube 1, small convex portions that can exist on the surface of the distal end E2 can be broken by heat. As a result, it is possible to suppress emission of electrons from the distal end E2 at the time of use of the X-ray generation tube 1 (at the time of X-ray generation). Accordingly, it is possible to suppress collision of electrons emitted from the distal end E2 against a member like the electrode 931, that is, a portion that is not the target 933, and thus caused radiation of X-rays from the portion. Additionally, in the arrangement in which the thermal conductivity of the distal end E2 is lower than the thermal conductivity of the second portion 42 (plate portion 421) (that is, in the arrangement in which the thermal conductivity of the second portion 42 is higher than the thermal conductivity of the distal end E2), heat generated in the second portion 42 due to collision of electrons against the second portion 42 can quickly be diffused at the time of use of the X-ray generation tube 1 (at the time of X-ray generation). Accordingly, it is possible to reduce a change of the shape of the electron passage hole 422 caused by deformation of the second portion 42 by the heat, and it is also possible to stabilize the reduced X-ray focal dimension.

In an example, the first portion 41 is made of stainless steel, and the second portion 42 is made of molybdenum or a molybdenum alloy. The stainless steel that forms the first portion 41 can be, for example, SUS304, SUS304L, SUS316, SUS316L, or the like. The thermal conductivities of these stainless steels can be 13.8 to 27.2 (W/(m·° C.)) at 100° C. The thermal conductivity of molybdenum is 128 (W/(m·° C.)) at 300 K.

In another example, the first portion 41 can be made of stainless steel, and the second portion 42 can be made of tungsten, a tungsten alloy, copper, a copper alloy, tantalum, a tantalum alloy, niobium, a niobium alloy, or the like. In a still another example, the first portion 41 can be made of stainless steel, and the second portion 42 can be made of silicon carbide.

The first portion 41 and the second portion 42 can electrically be connected. The first portion 41 and the extraction electrode 30 can electrically be connected. The gate electrode 20 including the passage hole 22 through which electrons pass can be arranged between the cathode 10 and the extraction electrode 30. The gate electrode 20 is given a potential lower than the potential given to the cathode 10.

The second portion 42 can define at least part of a columnar first space SP1. In the example shown in FIG. 2, the second portion 42 defines part of the columnar first space SP1, an inside surface IS1 of the first portion 41 defines another part of the columnar first space SP1, and the extraction electrode 30 forms still another part of the columnar first space SP1. The first space SP1 can have, for example, a columnar shape. The opposing surface UP1 of the second portion 42 and the inside surface IS1 of the first portion 41 can define at least part of a second space SP2.

Figure 3:
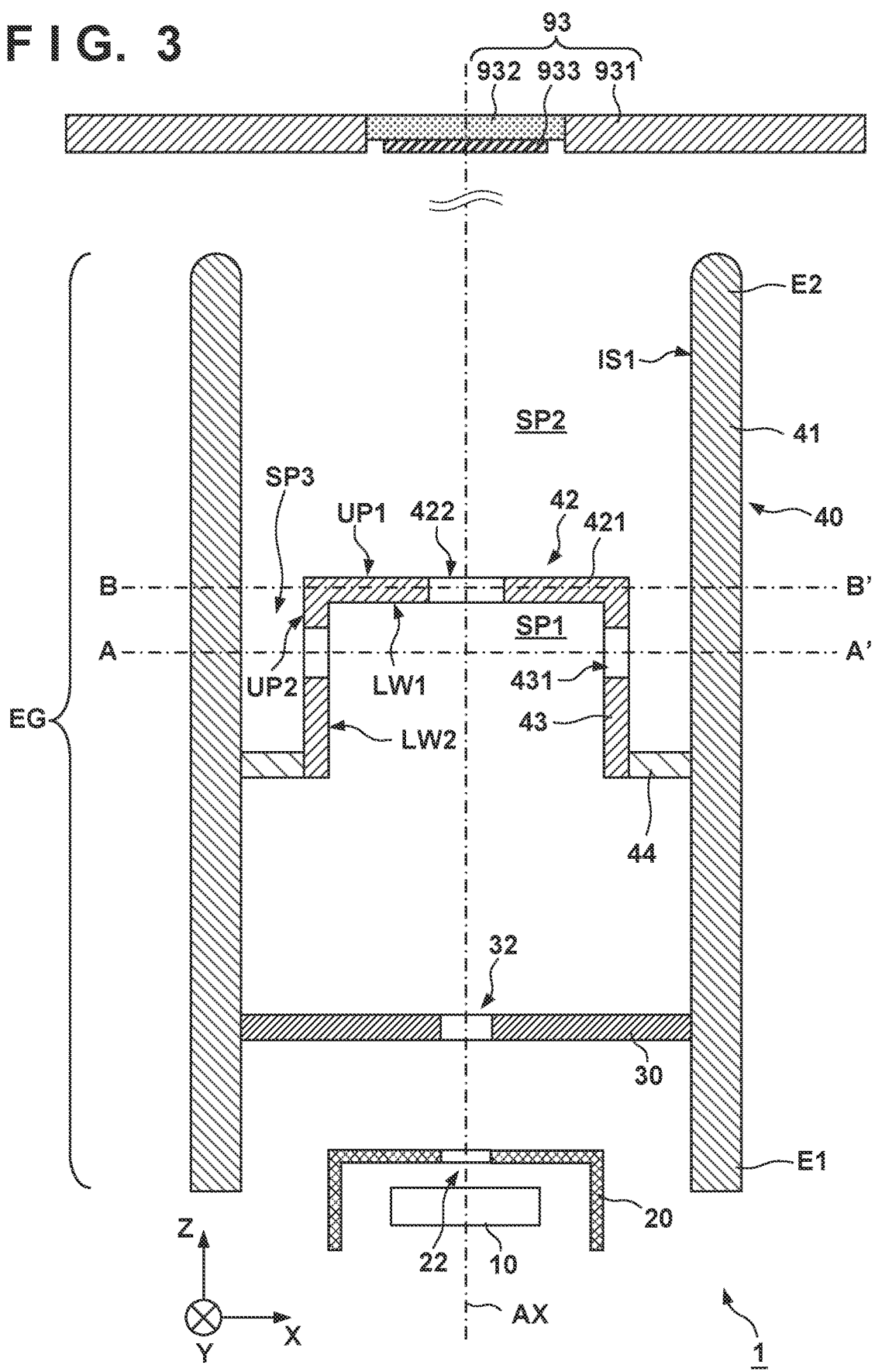
FIG. 3 is a sectional view schematically showing the arrangement of an electron gun according to the second embodiment of the present invention.
Figure 4:
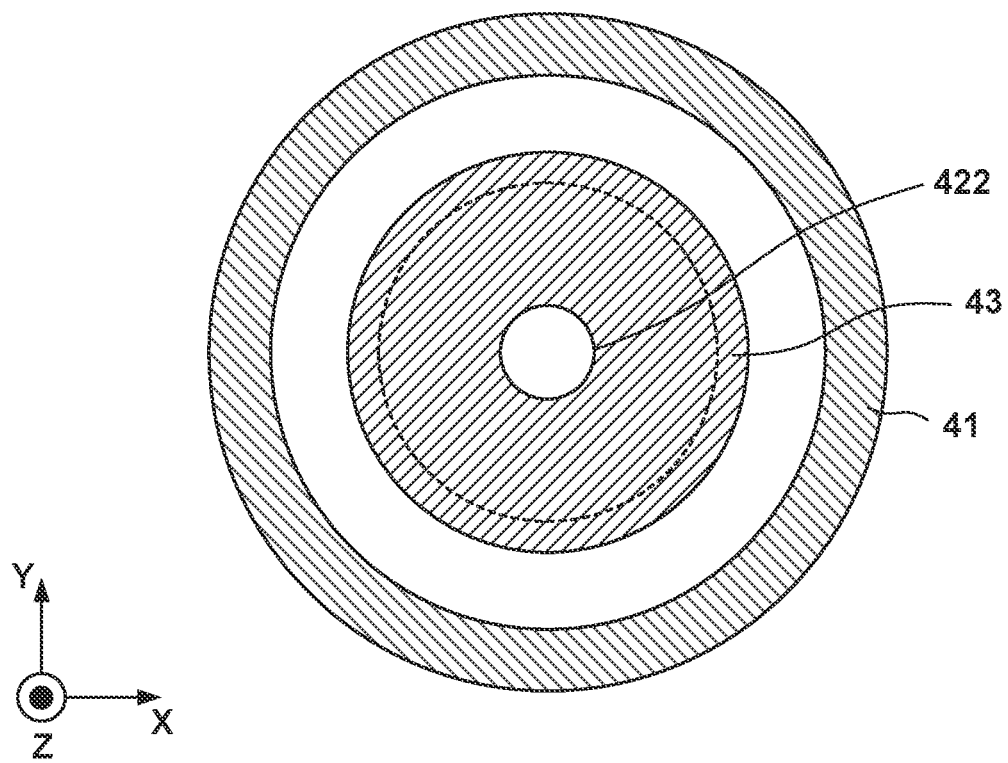
FIG. 4 is a view showing a section taken along a line B-B' in FIG. 3.
Figure 5:
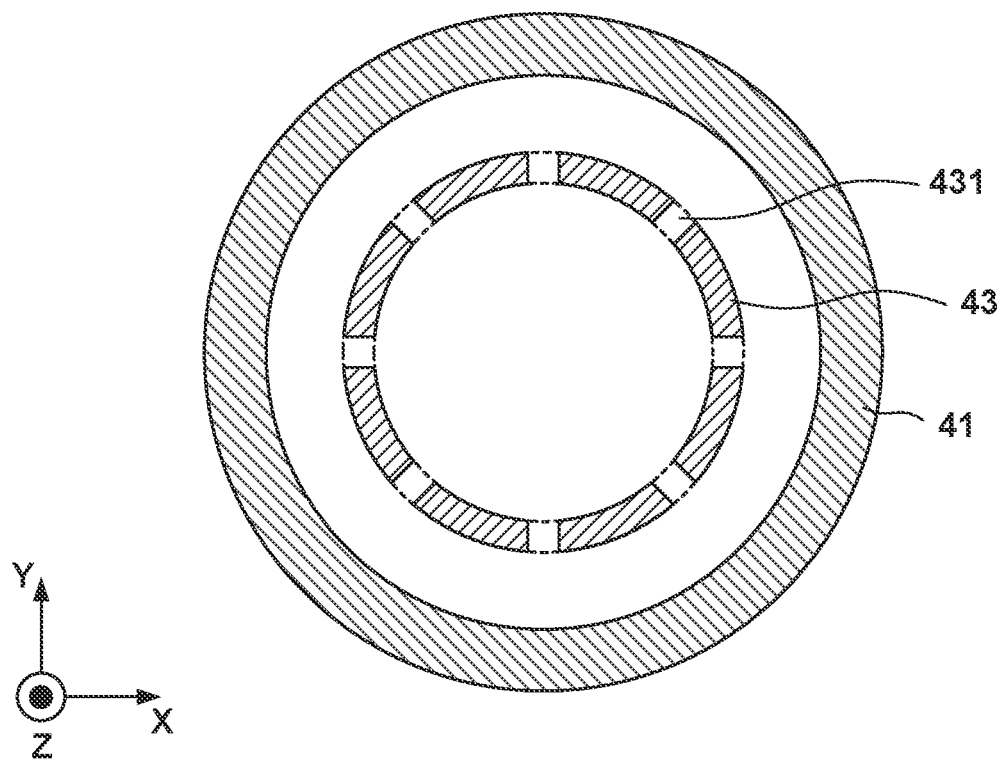
FIG. 5 is a view showing a section taken along a line A-A' in FIG. 3.

FIG. 3 schematically shows the arrangement of an X-ray generation tube 1 according to the second embodiment of the present invention. FIG. 4 shows a section taken along a line B-B' in FIG. 3. FIG. 5 shows the first example of a section taken along a line A-A' in FIG. 3. FIG. 3 shows an electron gun EG and an anode 93 which are arranged close. However, the electron gun EG and the anode 93 can be arranged farther apart. Matters that are not mentioned as the second embodiment can comply with the first embodiment.

The electron gun EG can include a cathode 10 including an electron emitting portion that emits electrons, an extraction electrode 30 that extracts the electrons emitted from the electron emitting portion, and a focusing electrode 40 that focuses the electrons extracted by the extraction electrode 30. As the electron emitting portion, the cathode 10 can emit electrons when, for example, heated by a heater arranged nearby. The extraction electrode 30 includes a passage hole 32 through which electrons pass. The electron gun EG may include a gate electrode 20 between the cathode 10 and the extraction electrode 30. The gate electrode 20 includes a passage hole 22 through which electrons pass.

The focusing electrode 40 can include a first portion 41 having a tubular shape, and a second portion 42 arranged inside the first portion 41. The second portion 42 can include a cathode-side surface (a surface on the cathode side) located on the side of the cathode 10, and an anode-side surface (a surface on the anode side) on the opposite side of the cathode-side surface. The cathode-side surface of the second portion 42 can include a first surface LW1, and a second surface LW2 having an angle with respect to the first surface LW1. The anode-side surface of the second portion 42 can include a third surface UP1 (opposing surface) on the opposite side of the first surface LW1, and a fourth surface UP2 (outside surface) arranged on the opposite side of the second surface LW2 and having an angle with respect to the third surface (opposing surface) UP1.

At least part of a first space SP1 can be defined by the first surface LW1 and the second surface LW2 of the second portion 42. In another viewpoint, (the first surface LW1 and the second surface LW2 of) the second portion 42 can define the columnar (for example, cylindrical) first space SP1 inside the second portion 42.

In addition, a second space SP2 can be defined by the third surface (opposing surface) UP1 of the second portion 42 and an inside surface IS1 of the first portion 41. Furthermore, part of a third space SP3 can be defined by the fourth surface UP2 (outside surface) of the second portion 42 and the inside surface IS1 of the first portion 41. The second portion 42 can include an electron passage hole 422 through which electrons pass, and a communicating portion 431 that makes the first space SP1 and the third space SP3 communicate with each other. In another viewpoint, the communicating portion 431 makes the inside space (first space SP1) of the second portion 42 communicate with the outside spaces (the second space SP2 and the third space SP3) formed by the outside surfaces UP1 and UP2 of the second portion 42 and the inside surface IS1 of the first portion 41.

The second portion 42 can include a plate portion 421 with the electron passage hole 422, and a tubular portion 43 having a tubular shape. In another viewpoint, one end of the tubular portion 43 can be connected to the plate portion 421. The focusing electrode 40 can further include a connecting portion 44 that connects the other end of the tubular portion 43 and the first portion 41. The connecting portion 44 may be formed by a conductive member, or may be formed by an insulator. The communicating portion 431 of the second portion 42 can make the first space SP1 communicate with the second space SP2 via the third space SP3. The communicating portion 431 can be provided in the tubular portion 43.

The first portion 41 and the second portion 42 can be configured to have a coaxial structure with respect to an axis AX. The first portion 41 can include a cylindrical portion with respect to the axis AX as the center axis. The second portion 42 can include a cylindrical portion with respect to the axis AX as the center axis. The first portion 41 can be arranged to surround the side of the second portion 42 throughout the perimeter. Alternatively, the first portion 41 can be arranged to surround the second portion 42 throughout the perimeter in any section that is orthogonal to the axis AX and cuts the second portion 42. In another viewpoint, the first portion 41 can be arranged to surround the communicating portion 431 of the second portion 42. Alternatively, the first portion 41 can be arranged to surround the communicating portion 431 of the second portion 42 in any section that is orthogonal to the axis AX and cuts the communicating portion 431 of the second portion 42. The above-described arrangement is effective to suppress discharge between the second portion 42 of the focusing electrode 40 and a member (not shown) that can be arranged outside the focusing electrode 40. This particularly advantageously acts in a case in which the second portion 42 includes a portion with a small radius of curvature (a portion with a large curvature) that can induce discharge.

In an example, the first space SP1 can be defined by the extraction electrode 30 in addition to the second portion 42. The first space SP1 is not a closed space and communicates with the second space SP2 via the electron passage hole 422 and the communicating portion 431. In addition, the first space SP1 communicates with the space on the side of the cathode 10 via the passage hole 32.

The first portion 41 and the second portion 42 are electrically connected to each other and can be given the same potential. Alternatively, the first portion 41, the second portion 42, and the connecting portion 44 are electrically connected to each other and can be given the same potential. The extraction electrode 30 may electrically be connected to the second portion 42, or may electrically be insulated from the second portion 42 and given a potential different from a potential given to the second portion 42. In an example, the extraction electrode 30 is fixed to the focusing electrode 40.

The plate portion 421 provided in the second portion 42 of the focusing electrode 40 limits the diameter of an electron beam reaching the second space SP2. Only electrons that have passed through the electron passage hole 422 provided in the plate portion 421 form the electron beam reaching the second space SP2. The remaining electrons collide against the plate portion 421 and are absorbed by the plate portion 421. When the plate portion 421 including the electron passage hole 422 is provided in the second portion 42, the electron beam emitted from the electron gun EG can be focused to a smaller region.

When electrons from the cathode 10 collide against the first surface LW1 of the plate portion 421, a gas can be emitted from the first surface LW1. If the gas stays in the first space SP1 for a long time, the probability that the electrons from the cathode 10 collide against the gas rises. The gas can be ionized by the collision between the electrons and the gas. Thus generated ions are accelerated toward the cathode 10 and can collide against the cathode 10. This can cause degradation of the cathode 10.

To prevent this, in the electron gun EG according to the second embodiment, the communicating portion 431 that makes the first space SP1 and the second space SP2 communicate is provided in the second portion 42. The communicating portion 431 can be arranged at a position where the electrons do not become incident on it or at a position where the possibility of incidence of the electrons is low. In another viewpoint, the communicating portion 431 can be arranged at a position where the electrons do not pass. The communicating portion 431 allows the gas that can be generated in the first space SP1 to be quickly discharged from the first space SP1 to the second space SP2. This functions to suppress degradation of the cathode 10.

The focusing electrode 40 may be formed such that a linear path via the communicating portion 431 exists between the inside surface IS1 of the first portion 41 and a region of the plate portion 421 where the electrons can collide. Alternatively, the focusing electrode 40 may be formed such that a linear path via the communicating portion 431 exists between the electron passage hole 422 provided in the plate portion 421 and the inside surface IS1 of the first portion 41. Such an arrangement allows the gas that can be generated by the collision of electrons against the plate portion 421 to be quickly discharged to the second space SP2 (or the third space SP3).

The first portion 41 includes a distal end (first end) E2 on the side of the electron emitting portion of the cathode 10, and a rear end (second end) E1 on the opposite side of the distal end E2. The rear end E1 can be formed not to have an angular portion. Such an arrangement is effective to suppress discharge between the first portion 41 and a member that can be arranged outside it.

Figure 6:
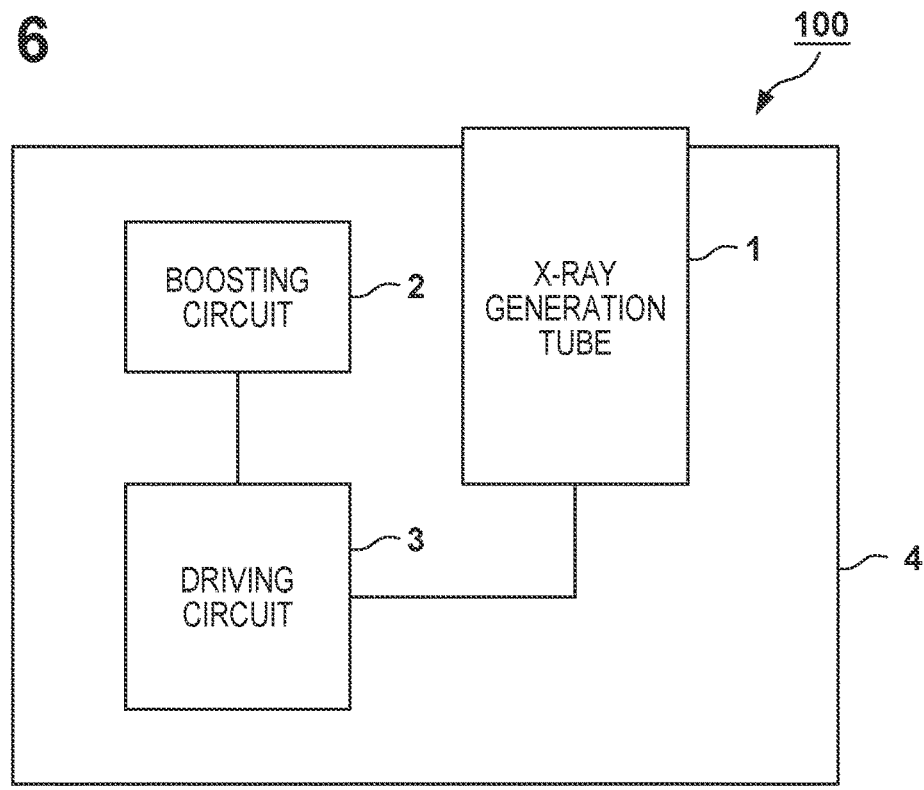
FIG. 6 is a sectional view schematically showing the arrangement of an X-ray generation apparatus according to an embodiment of the present invention.

FIG. 6 shows the arrangement of an X-ray generation apparatus 100 according to an embodiment of the present invention. The X-ray generation apparatus 100 can include the above-described X-ray generation tube 1, and a driving circuit 3 that drives the X-ray generation tube 1. The X-ray generation apparatus 100 can further include a boosting circuit 2 that supplies a boosted voltage to the driving circuit 3. The X-ray generation apparatus 100 can further include a storage container 4 that stores, the X-ray generation tube 1, the driving circuit 3, and the boosting circuit 2. The storage container 4 can be filled with insulating oil.

Figure 7:
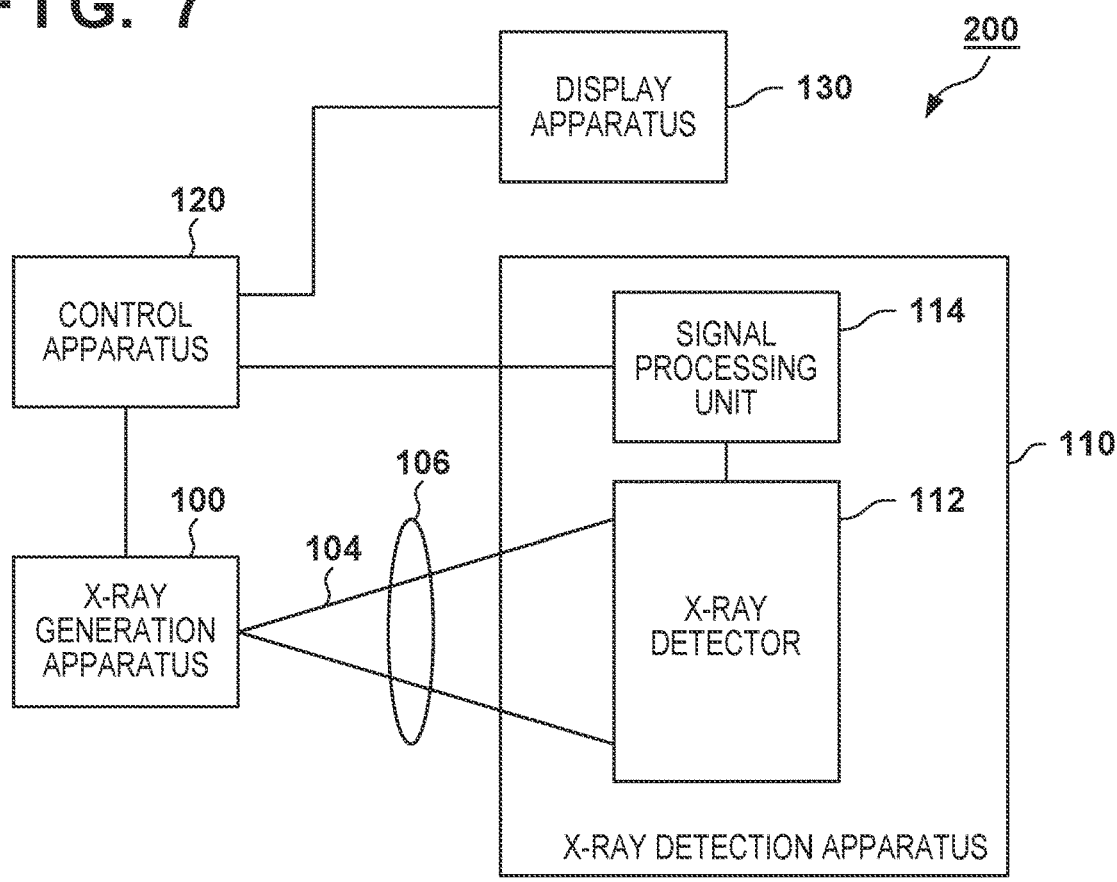
FIG. 7 is a view showing the arrangement of an X-ray imaging apparatus according to an embodiment of the present invention.

FIG. 7 shows the arrangement of an X-ray imaging apparatus 200 according to an embodiment of the present invention. The X-ray imaging apparatus 200 can include the X-ray generation apparatus 100, and an X-ray detection apparatus 110 that detects X-rays 104 radiated from the X-ray generation apparatus 100 and transmitted through an object 106. The X-ray imaging apparatus 200 may further include a control apparatus 120 and a display apparatus 130. The X-ray detection apparatus 110 can include an X-ray detector 112 and a signal processing unit 114. The control apparatus 120 can control the X-ray generation apparatus 100 and the X-ray detection apparatus 110. The X-ray detector 112 detects or captures the X-rays 104 radiated from the X-ray generation apparatus 100 and transmitted through the object 106. The signal processing unit 114 can process a signal output from the X-ray detector 112 and supply the processed signal to the control apparatus 120. The control apparatus 120 causes the display apparatus 130 to display an image based on the signal supplied from the signal processing unit 114.

The present invention is not limited to the above embodiments, and various changes and modifications can be made within the spirit and scope of the present invention. Therefore, to apprise the public of the scope of the present invention, the following claims are made.

The invention claimed is:

1. An X-ray generation tube comprising an electron gun, and an anode including a target configured to generate X-rays upon collision with electrons from the electron gun, wherein the electron gun includes a cathode having an electron emitting portion, an extraction electrode configured to extract the electrons emitted from the electron emitting portion, and a focusing electrode configured to focus the electrons extracted by the extraction electrode, the focusing electrode includes a first portion having a tubular shape, and a second portion arranged inside the first portion, the first portion includes a distal end facing the anode, the second portion includes an opposing surface facing the anode, and the opposing surface includes an electron passage hole configured such that the electrons from the electron emitting portion pass therethrough, a distance between the distal end and the anode is shorter than a distance between the opposing surface and the anode, and a thermal conductivity of the distal end is lower than a thermal conductivity of the second portion.

2. The X-ray generation tube according to claim 1, wherein the first portion includes a cylindrical portion including the distal end, and the second portion includes a disc-shaped portion including the electron passage hole.

3. The X-ray generation tube according to claim 1, wherein the first portion and the second portion are electrically connected.

4. The X-ray generation tube according to claim 1, wherein the first portion and the extraction electrode are electrically connected.

5. The X-ray generation tube according to claim 1, further comprising a gate electrode arranged between the cathode and the extraction electrode.

6. The X-ray generation tube according to claim 5, wherein the gate electrode is given a potential lower than a potential given to the cathode.

7. The X-ray generation tube according to claim 1, wherein the first portion is substantially made of stainless steel, and the second portion is substantially made of molybdenum.

8. The X-ray generation tube according to claim 1, wherein the second portion defines at least part of a columnar first space, and an inside surface of the first portion and the opposing surface of the second portion define at least part of a second space, and the second portion includes a communicating portion configured to make the first space and the second space communicate.

9. The X-ray generation tube according to claim 8, wherein the first portion surrounds the communicating portion.

10. The X-ray generation tube according to claim 8, wherein the second portion includes a plate portion including the electron passage hole, and a tubular portion having a tubular shape, and one end of the tubular portion is connected to the plate portion, and the communicating portion is provided in the tubular portion.

11. The X-ray generation tube according to claim 10, wherein a third space is defined between an outside surface of the tubular portion and the inside surface of the first portion, and the communicating portion of the second portion makes the second space and the first space communicate via the third space.

12. An X-ray generation apparatus comprising:
an X-ray generation tube of claim 1; and
a driving circuit configured to drive the X-ray generation tube.

13. An X-ray imaging apparatus comprising:
an X-ray generation apparatus of claim 12; and
an X-ray detection apparatus configured to detect X-rays radiated from the X-ray generation apparatus and transmitted through an object.

* * * * *